Jan. 19, 1960   S. TOUR   2,922,047
RADIOGRAPHY CASSETTE
Filed Oct. 2, 1958   2 Sheets-Sheet 1
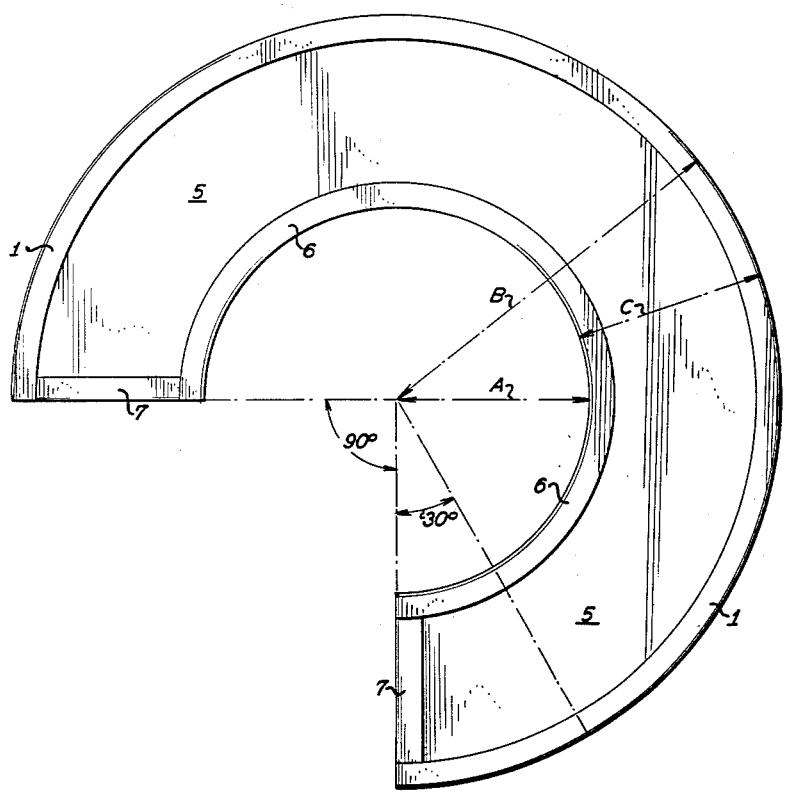
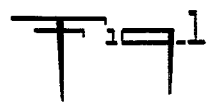
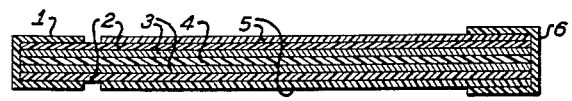
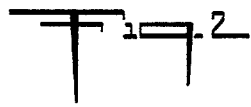
INVENTOR
SAM TOUR
BY *Burgess Dinklage & Sprung*
ATTORNEYS Jan. 19, 1960  S. TOUR  2,922,047
RADIOGRAPHY CASSETTE
Filed Oct. 2, 1958  2 Sheets-Sheet 2
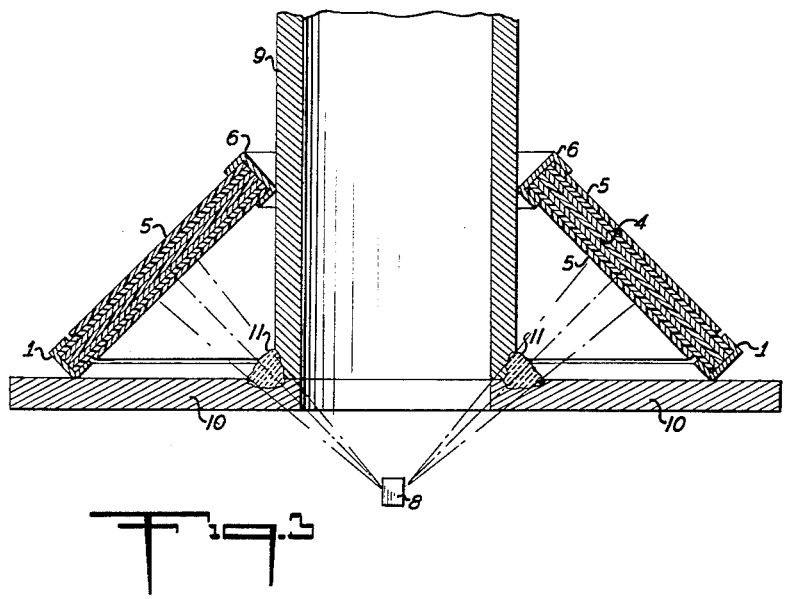
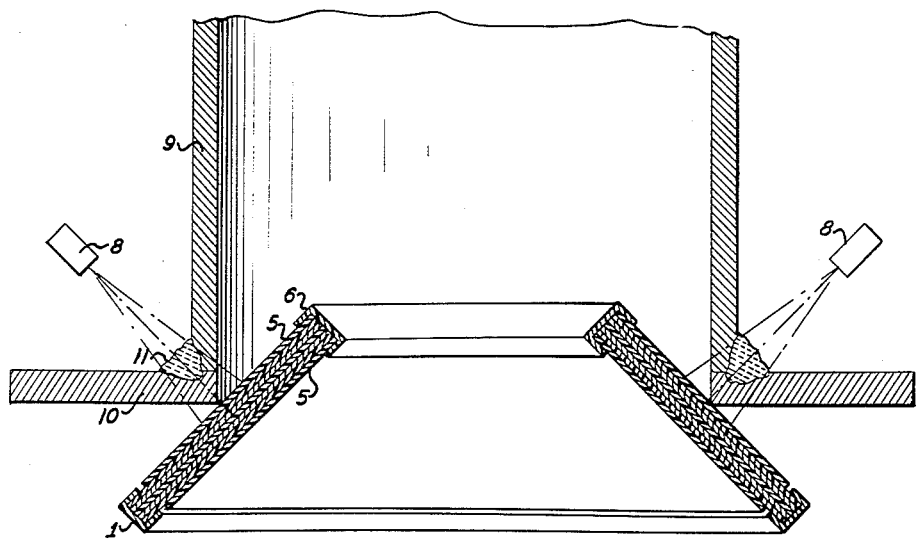
SAM TOUR
INVENTOR
BY Burgess Dinklage Sprung
ATTORNEYS United States Patent Office 2,922,047
Patented Jan. 19, 1960

2,922,047
RADIOGRAPHY CASSETTE

Sam Tour, New York, N.Y., assignor to Sam Tour & Co. Inc., a corporation of New York Application October 2, 1958, Serial No. 764,810

6 Claims. (Cl. 250—68)

This invention relates to a novel radiography cassette.

The invention more particularly relates to a novel radiography cassette for the radiography of welds, such as fillet welds at pipe junctions where the surface joined to the pipe extends to an angle to the pipe axis.

In many instances, it has become accepted practice to check the soundness of structural members and joints, as for example welded joints by radiography. For this purpose penetrating rays from a suitable source, as for example, X-rays from an X-ray tube or gamma rays from radio-active material, as for example radio-active cobalt 60, are passed through the member being tested to impinge on a photographic film, such as an X-ray film, on the opposite side of the member, thus forming a negative photograph of the member. The radiography film is generally maintained in position in a film holder, consisting of a suitable light-proof container, such as an envelope made of plastic paper or more rigid materials as for example aluminum, Bakelite, etc. Additionally, within the light-proof container and in contact with one and preferably both sides of the film, intensifying screens, for example of high molecular weight metal, such as lead, are positioned.

The film holder, containing the film, and preferably the intensifying screen or screens generally is referred to as a radiography cassette. While cassettes of various shapes have been developed for the radiography of different shaped structural members, certain difficulties have been encountered when attempting to radiograph welds at the junction of pipes or cylinders with other members, as for example in connection with fillet welds at pipe flange junctions, pipe expansion joints, pipe-to-pipe or pipe-to-cylinder connections. When using the conventionally available cassettes, and positioning the same in the best available position, with respect to the weld, it was not possible to obtain the uniform spacing of weld to film that is desired for a precise radiograph.

One object of this invention is to overcome the above-mentioned difficulties. This and still further objects will become apparent from the following description read in conjunction with the drawings in which:

Fig. 1 is a plan view of an embodiment of a cassette in accordance with the invention in flat cut out position, Fig. 2 is a cross section of the cassette shown in Fig. 1, Fig. 3 is a vertical section showing the cassette in accordance with the invention in position for the radiography of a fillet weld of a right angle flange connection joint, and Fig. 4 is a vertical section showing a different positioning of an embodiment of the cassette in accordance with the invention for the radiography of a fillet weld of a pipe flange joint.

In accordance with the invention, it has been discovered that the prior art difficulties encountered in the radiography of fillet welds connecting a pipe and a surface, forming an angle with the pipe axis, may be overcome by a cassette that may be flexed and set in such a position that will maintain the film on the opposite side of the weld from the source of the rays at substantially right angles to the rays and in the form of at least a section of a cone.

The cassette, in accordance with the invention, which allows this positioning of the film is a substantially flat cassette of such configuration that it can be shaped to fit the contour of the weld being examined. The shaped radiography cassette is most preferably in the shape of a truncated cone. The angle of the cone should be such that the rays from the source are normal to the film in the cassette. Thus, for example, a 90° truncated cone should be used in connection with the radiography of right angle joints, such as fillet welds connecting right angle flange joints to pipes, when the rays bisect the said right angle.

The cassette is preferably initially formed as a flat, flexible member, having a substantially circular central cut out and a circular length of somewhat less than 360 degrees so as to have two free ends, whereby the same may be formed into the shape of a truncated cone. The flat shape is preferably the shape of the major portion of an annulus having two, spaced apart, free ends, the edges of which, preferably extend in a radial direction.

Referring to the embodiments shown in the drawings, as shown in Figs. 1 and 2, the cassette consists of conventional radiography film, such as X-ray film 4 sandwiched between two intensifying screens 3 of high molecular weight material as, for example, of lead from .005 to .020 of an inch thick. Sandwiching the film and intensifying screens there between are two pieces of flexible lightproof sheet material, such as the black plastic sheets 2. One of the edges of these black plastic sheets 2 is bound in a light-tight manner by means of the member 1 which may, for example, consist of black tape or channels of extruded plastic or metal or the like. Superimposed over the plastic sheets 2 are two corresponding plastic sheets 5 bound on the opposite edge by means of the black adhesive tape, extruded plastic, or metal channels or the like 6. All of the members have in over-all plan view an annular shape as shown in Fig. 1. The flexible light-proof black plastic sheet material 5 with its bound edge 6 may be slid off from the flexible light-proof black plastic sheet material 2 so that the edge of the unit formed in the black plastic sheet material 2, opposite the bound edge 1, is open and the film may be slipped into place in the position shown. When the sheets 5 with the bound edge 6 are then slipped over the sheets 2 to the position shown in the figures, and the edges 7 bound with black tape or the like, the entire unit is sealed around the edges and light-proof. The entire unit may be made up in the dark room, and if made in this manner, the sheets 5 may be omitted and the open edge of the sheets 2 may be sealed in the same manner as shown at 1. Alternatively, the unit may be preformed and the film cut out according to the shape shown in Fig. 1 in the dark room and sandwiched between correspondingly shaped intensifying screens 3, slid into place between the sheets 2 and then the unit sealed by sliding the sheets 5 with the edge binding 6 in place and binding the remaining open edge at 7. The form, as shown in Fig. 1, is particularly adapted for radiographing a complete circular fillet weld with rays from the inside of the pipe. It consists of a major portion of an annulus extending about 270°. The radius A of the central cut out of the annulus, if the cassette is to surround the pipe, should equal about 1½ times the radius of the pipe. The width of the annulus C, which is the radius of the outer circumference B minus A and which, of course, is the width of the film, is not critical and generally will be determined by the size of the weld and pipe. In general, for example, with pipes 2″ to 3″ in diameter, C need only be about an inch whereas for pipes 6″ to 8″ in diameter, C may be about 2", and for larger diameters of pipe C should be larger, for example, 3" to 4" in size. By drawing the two ends of the cassette indicated at 7 toward each other, the cassette takes on a conical and, more exactly a "frusto-conical" shape. When the ends of a 270 degree annulus are overlapped 30°, as indicated by the dotted line in Fig. 1, the cassette assumes the form of a 90° truncated cone whose sides extend at an angle of 45° to its axis. The overlapping is desirable so that there will be no gaps between the end of the enclosed film 2 and the film will cover all of a circular weld. An overlap in the order of about 1" is generally all that is required for this purpose, and for larger pipe diameters, it is not necessary to have the full 30° overlap. In this connection, the cassette may be in the form of an annulus of 240° plus 1" additional length to provide for the overlap. The cassette in forming the cone may be wrapped about the pipe, as for example the pipe 9 for the radiography of the fillet weld 11 connecting the right angle flange 10 as shown in Fig. 3. When in the position as shown in Fig. 3, with a suitable overlap, the same may be held in position, as for example, by binding the overlapped ends with adhesive tape. The radiograph of the weld may then be taken by exposing the film in the cassette with the source of X-rays or gamma rays as, for example, from the capsule 8 containing radioactive cobalt 60 so that the rays pass through the weld at a right angle to the film to expose the film. If the angle formed between the axis of the pipe and the rays from the source is other than 90°, the cone formed from the cassette should have an angle so that the rays strike it in a substantially perpendicular manner. This may suitably be achieved by the manner in which the ends of the annulus as shown in Fig. 1 are brought together and/or the manner in which the annulus is initially cut out. In any event, however, the annulus should be of a sufficient arc so that a suitable overlapping of the ends may always be achieved.

It is obvious that two films sandwiched between three intensifying screens or "no-screen" film may be used in this cassette at the discretion of the user.

While the form shown in Figs. 1, 2 and 3 is most suitable, it is of course obvious that within the broadest scope of the invention this exact form need not be followed and it is merely necessary that in connection with a flat flexible cassette which may be formed into the conical shape, that the same need only have a substantially circular central cut out which may surround the pipe and be divided between the cut out and its circumference to form two free ends, such as the ends indicated at 7.

In certain instances where the cassette is to be repeatedly used for radiography of similar weld joints and may be slid over the end of the pipe, the same may be preformed in the conical shape by using substantially more rigid sheet material at 2 and/or 5 as shown in Fig. 2, and preferably by using a deformable resilient material, as for example plastic which will maintain its shape, but which can be bent out of the shape and will snap back in the manner of a spring. In such a case, the film cut to the suitable annular shape is slid into the cassette and the cassette closed as described above, the free ends sealed at 7 with the tape or the like, and the same will automatically assume the conical shape and may be slid over the end of the pipe or flexed outwardly and allowed to curl around the pipe.

The cassette may also be used for positioning inside a pipe with the source of radiation on the outside as shown in Fig. 4. For operation in this manner, the radius A should preferably be made smaller than the inside diameter of the pipe. In this connection as shown in Fig. 4, the source of radiation 8 is positioned at the outside of the joint. In any event, the preferred position of the film in the cassette is such that the radiation will be perpendicular to its face.

When positioning the cassette on the inside of the pipe, it is obvious that the same need not have a truncated conical shape but may, for example, be in the form of a section of a complete cone, though, of course the portion forming the tip of the cone serves no particular purpose.

When effecting the radiography in the manner shown in Fig. 4, with the source of radiation on the outside, it is generally necessary, when using but a single source of radiation, to effect the exposure in four different sections, moving, for example, the source of radiation progressively 90° around the circumference for each exposure. When operating in this manner, it is not necessary to use the cassette in the form of a complete cone or truncated cone, and it is merely necessary to use sections of the cone circumferentially extending over the portion being exposed, i.e., from about 90° to about 120°. For this purpose, the cassette may be formed in the manner shown in Fig. 1 except extending over an arc between about 90° and 120°. Particularly suitable for this purpose is the section of the annulus which is cut out when forming same in the form of Fig. 1.

Furthermore, in any event, if it is only necessary to radiograph part of a circular fillet weld, the cassette need only be formed through a section of a cone or truncated cone corresponding to this portion and the annulus cut out shown in Fig. 1 may be correspondingly smaller.

While the invention has been described in detail with reference to the specific embodiments shown, various changes and modifications will become apparent to the skilled artisan which fall within the spirit of the invention and scope of the appended claims.

I claim:

1. A substantially flat flexible radiography cassette comprising a pair of light-proof flexible sheets adjacently positioned to hold a film sandwiched therebetween, means sealing the edges of said sheets in a light-proof manner, forming a light-proof casing for film held between said sheets, said sheets having the shape of a major portion of an annulus having two spaced apart free ends whereby the same may be formed into the shape of a truncated cone.

2. A substantially flat flexible radiography cassette according to claim 1 in which said flat flexible sheets have the shape of a major portion of an annulus extending about 270°.

3. A substantially flat flexible radiography cassette according to claim 1 including at least one flexible intensifying screen having a shape corresponding to said sheets and positioned between said sheets.

4. In the method for the radiography of fillet welds on pipes in which penetrating rays are passed through the weld to expose a film on the opposite side thereof, the improvement for the radiography of fillet welds connecting a surface forming an angle with the pipe axis, such as flanges, expansion joints, pipe-to-cylinder joints, and the like which comprises passing the rays through the weld in a direction extending within the angle of the joint, shaping the film in the form of at least a section of a cone, and maintaining the thus conically shaped film on the opposite side of the weld at substantially right angles to the rays.

5. Improvement according to claim 4 in which the film is shaped in the form of a truncated cone.

6. Improvement according to claim 4 in which the penetrating rays are passed from the inside of the joint toward the outside and in which the film is shaped in the form of a truncated cone and maintained surrounding the pipe.

References Cited in the file of this patent

UNITED STATES PATENTS

| | | |
|---|---|---|
| 2,319,350 | Schiebold | May 18, 1943 |
| 2,494,740 | Boucher | Jan. 17, 1950 |
| 2,587,056 | McElroy et al. | Feb. 26, 1952 |
| 2,769,095 | Forrer et al. | Oct. 30, 1956 |
| 2,847,580 | Arvanetakis et al. | Aug. 12, 1958 |